United States Patent [19]

Williams

[11] Patent Number: 5,592,816
[45] Date of Patent: Jan. 14, 1997

[54] HYDROELECTRIC POWERPLANT

[76] Inventor: Herbert L. Williams, Rte. 1 Box 454, E. Palatka, Fla. 32131

[21] Appl. No.: 397,858

[22] Filed: Feb. 3, 1995

[51] Int. Cl.[6] .............................. F16D 31/02; B63H 1/34; B64C 11/24
[52] U.S. Cl. .................... 60/398; 415/7; 415/91
[58] Field of Search ................ 60/398; 415/7, 415/60, 91

[56] References Cited

U.S. PATENT DOCUMENTS

| | | | |
|---|---|---|---|
| 499,121 | 6/1893 | Kales | 415/91 |
| 4,004,427 | 1/1977 | Butler, Jr. | 60/398 X |
| 4,052,134 | 10/1977 | Rumsey | 416/140 R X |
| 4,163,904 | 8/1979 | Skendrovic | 60/398 X |
| 4,729,716 | 3/1988 | Schmidt | 416/142 X |
| 4,764,683 | 8/1988 | Coombes | 415/60 X |
| 4,843,250 | 6/1989 | Stupakis | 415/7 X |
| 5,440,176 | 8/1995 | Haining | 415/7 X |

FOREIGN PATENT DOCUMENTS

| | | | |
|---|---|---|---|
| 101192 | 10/1925 | Austria | 415/7 |
| 2258101 | 8/1975 | France | 415/7 |
| 2902518 | 7/1979 | Germany | 415/7 |

*Primary Examiner*—John E. Ryznic

[57] ABSTRACT

A hydroelectric turbine and a method of using the turbine in an open body of water to produce electric power is described. A turbine has a large opening to allow a stream of water to pass through. The turbine is supported by a plurality of rubber tires such that a reaction force from the stream of water holds against the tires. A frame with a floatation chamber is used to lower the turbine into position in the stream of water, and to raise the turbine to a horizontal position on the surface of the body of water. The floatation chamber is partially filled with water to lower the turbine in the body of water such that an air pocket exists in the chamber to orient the turbine in a vertical position. When the chamber is purged of water, the turbine is raised to the surface. Rotation of the turbine drives the tires, which drive pumps to pump fluid to a motor, which drives an electric generator to produce power.

7 Claims, 4 Drawing Sheets

SECTION 8

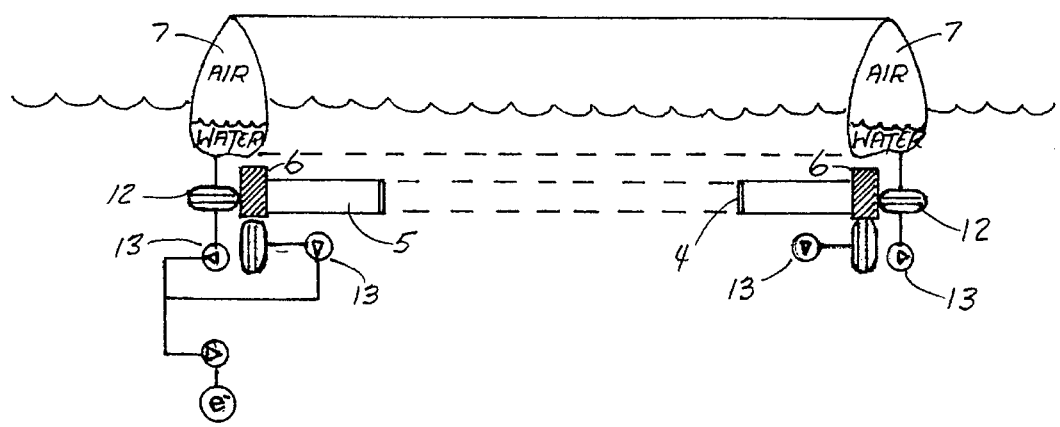
NON-ROTATIONAL MODE
FIG. 4
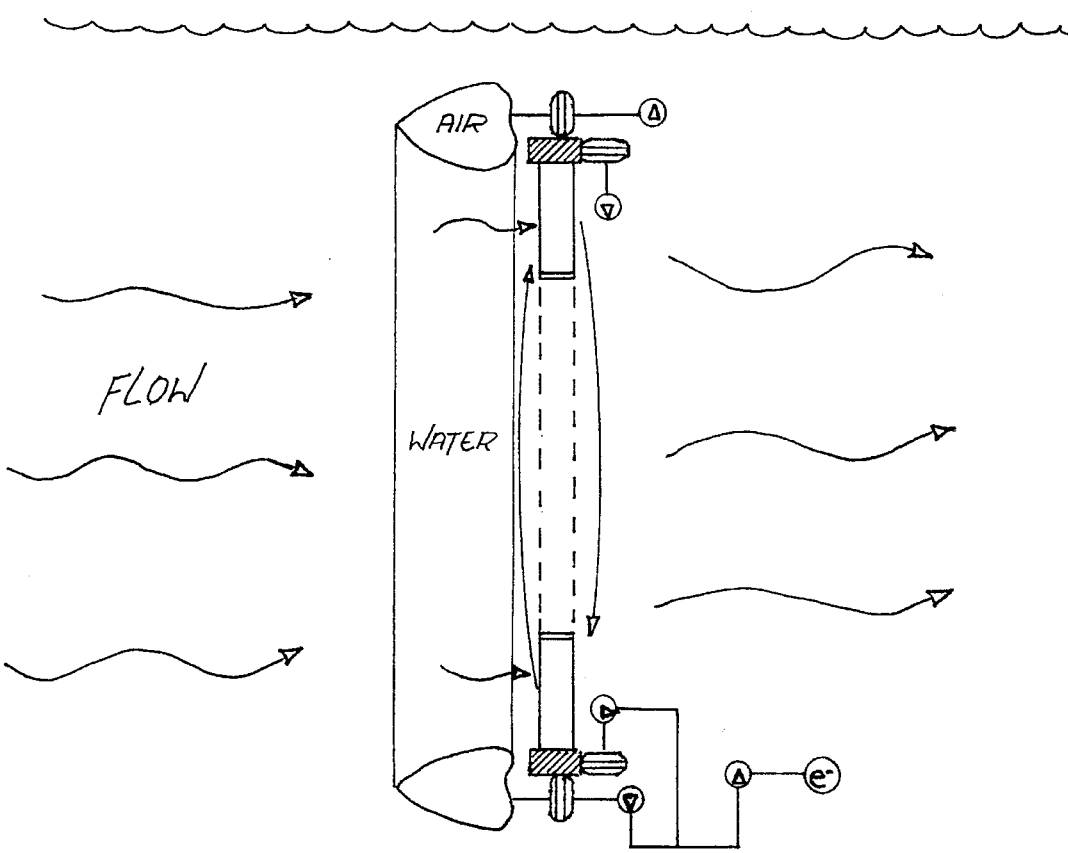
ROTATIONAL MODE

HYDROELECTRIC POWERPLANT

BRIEF SUMMARY

The present invention combines elements of a hydroelectric power plant, the entire system of which produces electricity in a totally submerged attitude below the oceans surface, and upon blowing ballast rises to the surface for transportation, inspection and maintenance. The system of the present invention produces electricity to be routed to shore through buried conductor cables to a land based switching station. The system of the present invention provides efficient electricity in the following manner:

The water current flows through two turbines causing them to turn each in opposite rotation of the other. Pressed tightly against the outer rims of the turbines are synthetic rubber tires coupled directly to hydraulic type pumps. The turbines turn the synthetic rubber tires which turn the hydraulic pumps which pump oil under pressure to the frame of the machine which is constructed of pipe. The oil under pressure is routed through passages in the frame to a central area where the hydraulically turned electric generator is located. The oil under pressure does the work of turning the generator and is returned back to the pumps through difference passages than those used for pressure.

The entire system is secured to the ocean bottom and buoyed off bottom so that no part of it is visible from the surface.

BRIEF DESCRIPTION OF THE DRAWINGS

FIG. 4, is a cross-section view of the power plant in both a rotational and a non-rotational mode.

DESCRIPTION OF THE PREFERRED EMBODIMENT

Figure 1:
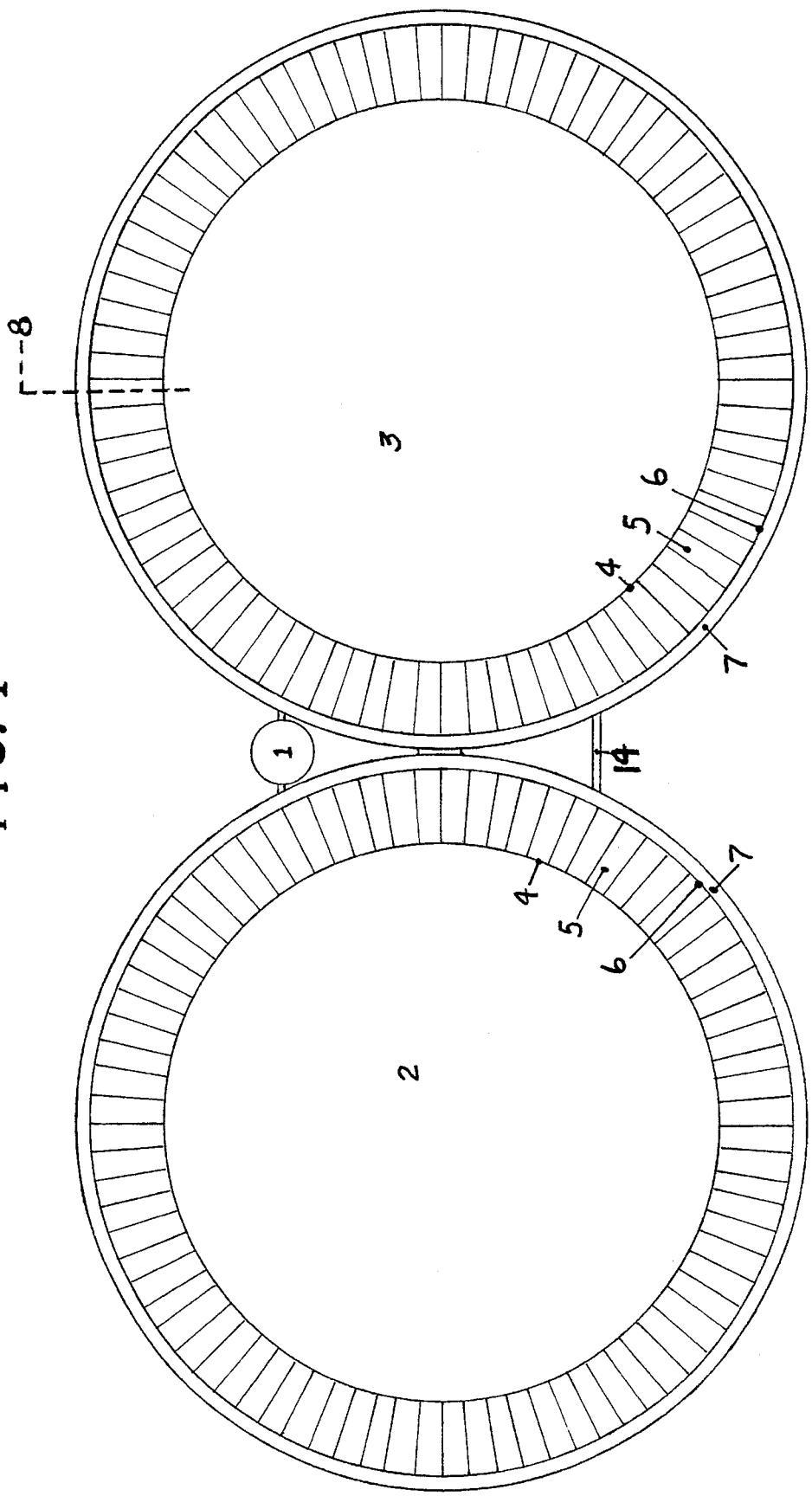
FIG. 1, is a elevation front view of a hydroelectric power plant according to an embodiment of the present invention, suspended from the bottom of the ocean is viewed from directly up current.
Figure 2:
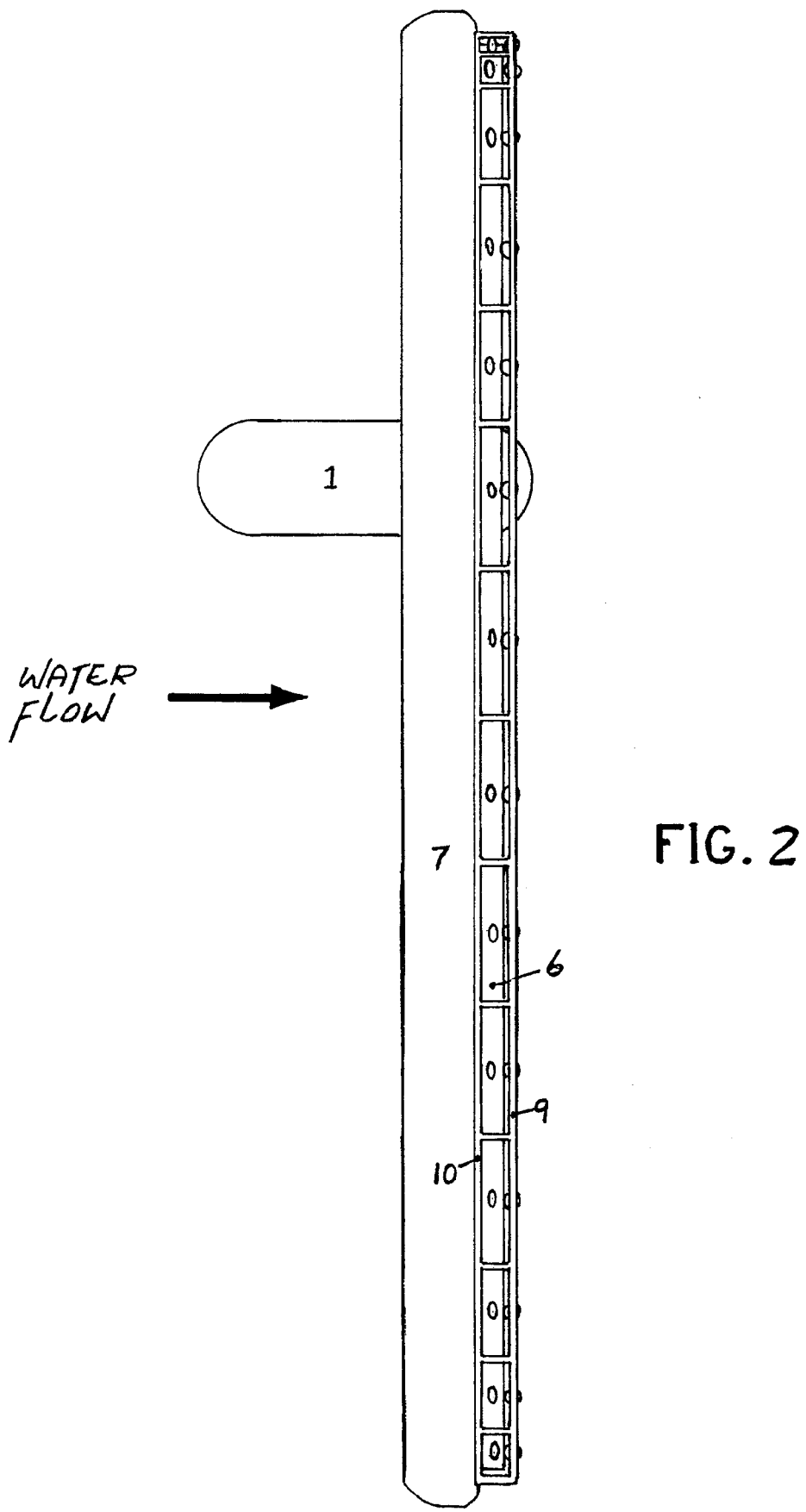
FIG. 2, is a representation in elevation side view of the hydroelectric power plant in FIG. 1.
Figure 3:
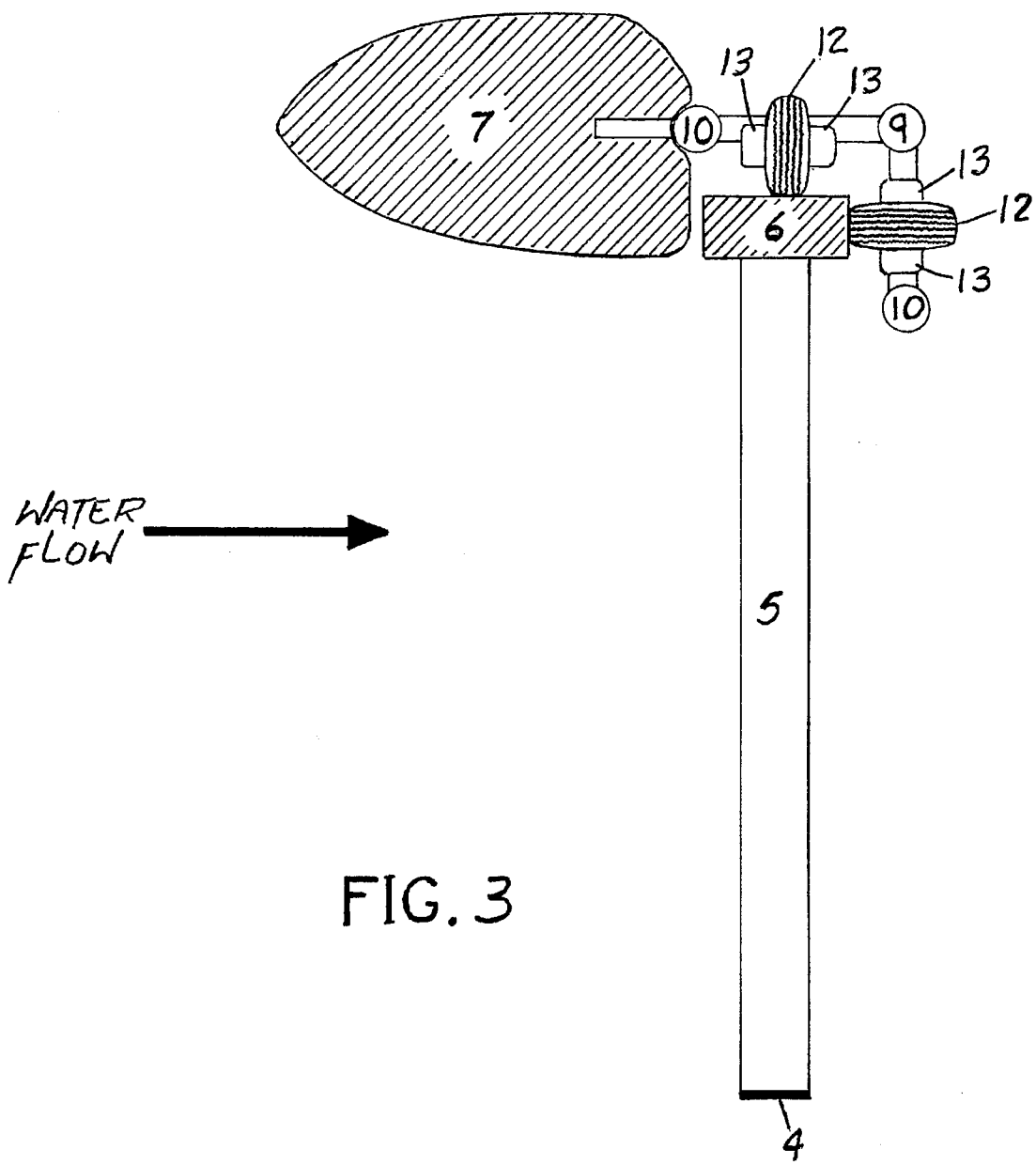
FIG. 3, is cross-section developed view of the frame, turbine and flotation chamber of the hydroelectric power plant of FIGS. 1 and 2.

Referring now in detail to the drawings, and in particular to FIGS. 1, 2, 3 and 4, a hydroelectric power plant located submerged in a body of water with a current.

Two turbines 4, 5 and 6 which are identical to each other in every aspect except pitch are rotated in opposite rotation from each other by the pressure differential in the water current flowing through them. Blades 5 are of a shape which is pitched from leading edge to trailing edge which enables them to turn as a result of the pressure on the upstream side of the blades 5 being greater than that of the downstream sides. The inner rims 4 and the outer rims 6 are secured to the blades 5 causing the entire turbines 4, 5 and 6 to be held securely together.

The synthetic rubber tires 12 are secured directly by the use of bolts to the shafts of the hydraulic pumps 13 which are attached to the frame 9 and 10 of the preferred embodiment. The pumps 13 when turned by the tires 12 pump oil under pressure which is introduced into the frame passage 9 to be routed to the generator enclosure 1 wherein is located a hydraulically powered generator. After the hydraulic oil has performed the work of turning the generator it is routed back to the pumps 13 via the frame passage 10. Brace 14 although structurally a brace to add rigidity to the frame 9 and 10 also is a passageway for hydraulic oil.

The floatation chambers 7 are hollow fiberglass enclosures which when filled with air cause the entire preferred embodiment to rise to the ocean surface and in doing so, fall forward taking on the attitude of being horizontal and floating on the surface. It is in this horizontal attitude that the turbines 4, 5 and 6 will stop turning since the pressure has equalized on both sides of blades 5. While in this horizontal attitude, the buoyancy of the flotation chambers 7 will hold the frame 9 and 10, the pumps 13, the tires 12 and the turbines 4, 5 and 6 above the waters surface to facilitate ease of transportation, inspection and maintenance.

When a portion of the air in flotation chambers 7 is released to the atmosphere, the water will enter the chambers 7 and allow the preferred embodiment to sink below the waters surface and back to its vertical attitude. As the water pressure against the blades 5 become unequal, the blades 5 will resume rotation and the generator will produce electricity.

The open areas 2 and 3 allow unrestricted water flow through them thereby reducing down current turbulence on the blades 5.

The frames 9 and 10, the flotation chambers 7, the pumps 13 and the generator enclosure 1 are held stationary in the water flow. Only the turbines 4, 5 and 6 and the tires 12 rotate in the water.

The tires 12 and the water flow hold the turbines 4, 5 and 6 on location while allowing them to rotate.

What is claimed is:

1. A hydroelectric turbine which:

has no central shaft;

transfers rotational energy from it's outer rim to synthetic rubber tires;

has an open area through it's center larger than the area occupied by it's blades;

has no bearings, bushings or friction load handling devices but depends on an external means to hold it in position.

2. A hydroelectric power plant for use in a body of water, comprising:

a turbine having a plurality of blades extending in a radial direction;

an outer and inner rim encircling the blades;

a plurality of rubber tires supporting the turbine in a vertical orientation during rotation of the turbine, and in a horizontal orientation during non-rotation of the turbine;

an electric generator enclosed in a generator enclosure, the generator being rotationally connected to at least one of the tires;

whereby a flow of water produces a rotation of the turbine, the rotation of the turbine produces a rotation of the tires, and the rotation of at least one of the tires produces a rotation of the generator which produces an electric power.

3. The hydroelectric power plant of claim 2 wherein the turbine has an open area through it's center which allows an unrestricted flow of water.

4. The hydroelectric power plant of claim 2 wherein the turbine is supported by rubber tires which are supported by a frame.

5. A method of stopping and starting a rotation of a turbine in a body of water, comprising the steps of:

providing a turbine having a plurality of blades extending in a radial direction;

providing an outer and inner rim encircling the blades;

providing a plurality of rubber tires to support the turbine in both a horizontal position and a vertical position;

providing a flotation chamber encircling the turbine;

filling the flotation chamber substantially with air to raise the turbine to a surface of the body of water such that a rotational axis of the turbine is perpendicular to the surface;

filling the flotation chamber substantially with water such that the heavier-than-air water comes to rest on a bottom of the flotation chamber and pulls the turbine under the surface of the water and pivots the turbine such that the rotational axis is directed parallel to the surface;

whereby a flow of water under the surface is directed along the rotational axis of the turbine to produce a rotation thereof.

6. A method of turning a generator in a body of water, comprising the steps of:

providing a hydraulic turbine of claim 5;

providing an electric generator enclosed in a generator enclosure;

providing at least one hydraulic motor being rotationally connected to an electric generator;

providing at least one hydraulic pump being rotationally connected to a plurality of rubber tires;

whereby the rotation of the turbine produces as rotation of the rotation of at least one rubber tire produces the rotation of at least one hydraulic pump which produces rotation of at least one hydraulic motor which produces rotation of an electric generator which produces an electric power.

7. A method of supporting a turbine in a body of water, comprising the steps of:

providing a turbine having a plurality of blades extending in a radial direction;

providing an outer and inner rim encircling the blades;

providing a plurality of rubber tires secured to a frame;

providing a frame with a flotation chamber secured to the bottom of the body of water and buoyed off bottom;

whereby a turbine which rotates is supported in every direction by rubber tires.

* * * * *